United States Patent
Marupaduga et al.

(10) Patent No.: US 10,129,889 B1
(45) Date of Patent: Nov. 13, 2018

(54) SELECTING PRIMARY AND SECONDARY COMPONENT CARRIERS FOR CARRIER AGGREGATION BASED ON CARRIER RECEIVE POWER AT A UE, TRANSMIT POWER, FREQUENCY, AND OTHER CARRIER ATTRIBUTES

(71) Applicant: Sprint Spectrum L.P., Overland Park, KS (US)

(72) Inventors: Sreekar Marupaduga, Overland Park, KS (US); Andrew M. Wurtenberger, Olathe, KS (US); John W. Prock, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 663 days.

(21) Appl. No.: 14/842,379

(22) Filed: Sep. 1, 2015

(51) Int. Cl.
*H04W 72/04* (2009.01)

(52) U.S. Cl.
CPC ..... *H04W 72/0473* (2013.01); *H04W 72/042* (2013.01); *H04W 72/0453* (2013.01)

(58) Field of Classification Search
CPC ........... H04W 72/0473; H04W 72/042; H04W 72/0453
See application file for complete search history.

(56) References Cited

U.S. PATENT DOCUMENTS

| | | | | |
|---|---|---|---|---|
| 2004/0104809 | A1* | 6/2004 | Rizzo | G06K 19/0723 340/10.34 |
| 2007/0121924 | A1* | 5/2007 | Hermans | H04M 19/08 379/399.02 |
| 2011/0274032 | A1* | 11/2011 | Leng | H04B 7/15542 370/315 |
| 2012/0039199 | A1* | 2/2012 | Chen | H04L 1/0027 370/252 |
| 2013/0157660 | A1* | 6/2013 | Awad | H04W 72/046 455/435.1 |
| 2013/0258954 | A1* | 10/2013 | Khoshnevis | H04L 1/0026 370/329 |
| 2013/0286952 | A1* | 10/2013 | Ghosh | H04L 5/0007 370/329 |
| 2013/0308590 | A1* | 11/2013 | Ihm | H04B 7/0632 370/329 |
| 2014/0140293 | A1* | 5/2014 | Sharma | H04L 5/001 370/329 |

(Continued)

*Primary Examiner* — Stephen J Clawson

(57) ABSTRACT

In a wireless network comprising a plurality of carriers available for carrier aggregation transmissions between a base station and UE, the base station: (i) determines whether a requirement exists to transmit data between the UE and the base station via a carrier aggregation transmission; (ii) in response to determining that the carrier aggregation transmission requirement exists, selects a primary component carrier and one or more secondary component carriers from the plurality of carriers for the carrier aggregation transmission based on one or more of each carrier's receive power at the UE, transmit power at the base station, and frequency; (iii) allocates the selected primary and secondary component carriers to the carrier aggregation transmission; (iv) informs the UE of the allocation; and (v) executes the carrier aggregation transmission according to the allocation.

20 Claims, 6 Drawing Sheets

(56) References Cited

U.S. PATENT DOCUMENTS

| | | | | |
|---|---|---|---|---|
| 2014/0226551 A1* | 8/2014 | Ouchi | .................... | H04W 52/04 370/311 |
| 2015/0085774 A1* | 3/2015 | Lin | ..................... | H04W 72/042 370/329 |
| 2015/0124638 A1* | 5/2015 | Sun | ....................... | H04L 5/0053 370/252 |
| 2015/0163041 A1* | 6/2015 | Kodali | ................... | H04L 1/1812 370/252 |
| 2015/0318893 A1* | 11/2015 | Tahir | ........................ | H04B 3/54 370/312 |
| 2017/0238262 A1* | 8/2017 | Park | .................... | H04W 52/146 455/522 |
| 2017/0251489 A1* | 8/2017 | Caretti | ............... | H04W 72/1263 |

\* cited by examiner

| Carrier ID | LTE Band | Frequency (MHz) | Bandwidth (MHz) | GDV (ns) | Insertion Loss (dB) | Transmit Power (W) |
|---|---|---|---|---|---|---|
| 1 | 41 | 2507.50 | 15 | 153 | -0.56 | 30 |
| 2 | 41 | 2522.60 | 15 | 22 | -0.66 | 30 |
| 3 | 41 | 2537.70 | 15 | 52 | -0.50 | 30 |
| 4 | 41 | 2550.30 | 10 | 66 | -0.44 | 30 |
| 5 | 41 | 2560.40 | 15 | 220 | -0.31 | 30 |
| 6 | 25 | 1942.50 | 15 | 120 | -0.38 | 25 |
| 7 | 25 | 1957.60 | 15 | 69 | -0.47 | 25 |
| 8 | 25 | 1972.70 | 10 | 160 | -0.45 | 25 |
| 9 | 26 | 865.00 | 10 | 100 | -0.45 | 20 |
| 10 | 26 | 875.10 | 10 | 120 | -0.64 | 20 |

FIG. 2

SELECTING PRIMARY AND SECONDARY COMPONENT CARRIERS FOR CARRIER AGGREGATION BASED ON CARRIER RECEIVE POWER AT A UE, TRANSMIT POWER, FREQUENCY, AND OTHER CARRIER ATTRIBUTES

BACKGROUND

Unless otherwise indicated herein, the description in this section is not itself prior art to the claims and is not admitted to be prior art by inclusion in this section.

Cellular wireless networks typically include a number of base stations that radiate to define wireless coverage areas, such as cells and/or cell sectors, in which user equipment devices (UEs) (also known as wireless communication devices (WCDs)) such as cell phones, "smart" phones, tablet computers, tracking devices, embedded wireless modules, and other wirelessly equipped communication devices, can operate. Each base station is coupled to network infrastructure that provides connectivity with one or more transport networks, such as the public switched telephone network (PSTN) for voice communications and/or the Internet for voice and/or data communications.

In general, a wireless network operates in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others.

Each air interface protocol has its own frame structure for transmissions on physical uplinks and downlinks. Each air interface protocol also defines its own procedures for allocating transmission resources within the uplink and downlink for transmitting and receiving control data (e.g., messaging sent between UEs and base stations for controlling access to the radio network) and user data (e.g., voice, voice over Internet Protocol (VoIP), email, Internet browsing, file downloads/uploads).

In LTE networks, for example, the downlink direction (from the base station to the UE) uses Orthogonal Frequency Division Multiple Access (OFDMA), which is a multi-carrier scheme based on Orthogonal Frequency Division Multiplexing (OFDM) whereby radio resources are allocated to multiple users. In operation, a downlink carrier's frequency bandwidth is split into many small 15 kHz subcarriers, and each individual subcarrier is modulated using, for example, QPSK (Quadrature Phase-Shift Keying), 16-QAM (Quadrature Amplitude Modulation), 64-QAM, or perhaps other digital modulation schemes.

In the uplink direction (from the UE to the base station), LTE uses a pre-coded version of OFDM known as Single Carrier Frequency Division Multiple Access (SC-FDMA), where data is spread across the subcarriers of multiple LTE resource blocks, which can then be modulated using, for example, QPSK, 16-QAM, 64-QAM, or perhaps other digital modulation schemes. By transforming the time domain symbols to the frequency domain with a discrete Fourier transform (DFT) before OFDM modulation, SC-FDMA creates a single-carrier waveform (i.e., the SC aspect of SC-FDMA) that is then frequency-shifted to the desired part of the frequency domain in the uplink (i.e., the FDMA aspect of SC-FDMA) for transmission by the UE to the base station.

SUMMARY

Some wireless network implementations use carrier aggregation on an uplink and/or downlink in a cell or wireless coverage area to increase the bandwidth for transmissions between a base station and a UE. For carrier aggregation, multiple component carriers are aggregated (or combined) to enable transmission between the base station and the UE at a bandwidth substantially equal to the sum of the individual bandwidths of the component carriers. For example, carrier aggregation with two 5 MHz component carriers provides 10 MHz of bandwidth for transmissions between the base station and UE. Similarly, carrier aggregation with three 10 MHz carriers enables 30 MHz of bandwidth for transmissions between the base station and UE.

LTE supports carrier aggregation with (i) multiple contiguous component carriers in the same LTE band, (ii) multiple non-contiguous component carriers in the same LTE band, or (iii) multiple non-contiguous component carriers in different LTE bands. LTE currently allows for aggregation of up to five individual 20 MHz component carriers to provide 100 MHz of bandwidth for transmissions between the LTE base station (sometimes identified herein as an eNodeB) and a UE. Some LTE network implementations may support other combinations of anywhere from two to five 1.4 MHz, 3 MHz, 5 MHz, 10 MHz, 15 MHz, or 20 MHz component carriers for carrier aggregation. Other network implementations (including perhaps implementations other than LTE) may support combinations of more or fewer carriers of bandwidths different than those explicitly identified herein.

When an eNodeB combines two or more component carriers into a group of carriers for carrier aggregation (sometimes referred to herein as a carrier aggregation group), the eNodeB designates one of the component carriers in the carrier aggregation group as the primary component carrier and the remaining component carriers in the carrier aggregation group as secondary component carriers. In operation, the eNodeB and UE may use any portion or portions of any carrier in the carrier aggregation group for data transmissions (e.g., voice over LTE (VoLTE), streaming video, file transfers, email, web browsing), but most control signaling between the base station and UE (e.g., LTE Radio Resource Control (RRC) signaling to request and facilitate data transmissions and other control signaling) occurs over the designated primary component carrier.

An LTE network typically has multiple carriers that can be combined for carrier aggregation transmissions. Of the multiple carriers, some carriers may have different levels of signal quality and reliability depending perhaps on attributes of the carriers themselves, the configuration of various radio frequency (RF) filters and amplifiers at the eNodeB radiating the carriers, the position of the UE relative to the eNodeB radiating the carrier, or perhaps other carrier attributes. And because most of the control signaling between the eNodeB and a UE occurs over the primary component carrier in a carrier aggregation group, it is advantageous for the eNodeB to select and allocate a high quality and/or reliable carrier from the multiple available carriers as the primary component carrier for the carrier aggregation group.

Some embodiments of the systems and methods disclosed herein include a base station (such as an LTE eNodeB)

determining that a requirement exists to transmit data between a UE and the base station via a carrier aggregation transmission, and in response to determining that a requirement exists, selecting a primary component carrier and one or more secondary component carriers for the carrier aggregation transmission based on at least in part on the value of a group delay metric for each of the multiple carriers in the network that are available for carrier aggregation transmission. The group delay metric may be the carrier's group delay or the carrier's group delay variation.

The group delay of a carrier is a measure of a time delay of the amplitude envelopes of the various sinusoidal components (e.g., the 15 KHz subcarriers in an LTE carrier) of the carrier signal as the signal propagates through one or more RF filters at the base station. Group delay in wireless transmission systems is typically measured in nanoseconds, but group delay could be measured in different time units in other transmissions systems. Group delay is inversely proportional to filter bandwidth and nearly proportional to the order of the filter. Because group delay is a function of the RF filter configuration at the base station, the group delay of a particular carrier is a static value that can be measured and quantified.

In LTE networks, the group delay variation of a carrier tends to be more problematic than the delay of any individual subcarrier of the carrier in part because of the way subcarriers are managed and allocated for data transmissions between base stations and UEs. In particular, an LTE carrier is divided into many small resource blocks, where each resource block includes twelve 15 kHz subcarriers. Group delay variation is the difference between the time delays of the subcarriers of a resource block, or perhaps the difference between the time delays of subcarriers in different resource blocks. These differences in inter-resource block and intra-resource block group delay tend to cause signal distortions that can reduce signal quality and reliability.

Like group delay, group delay variation in wireless networks is typically measured in nanoseconds, but group delay variation could be measured in different units in other types of transmission systems. And also like group delay, the group delay variation of a carrier is also a function of the RF filter configuration at the base station, and thus, the group delay variation of a carrier is a static value that can be measured and quantified.

Some embodiments may additionally or alternatively include a base station (such as an LTE eNodeB) determining that a requirement exists to transmit data between a UE and the base station via a carrier aggregation transmission, and in response to determining that a requirement exists, selecting a primary component carrier and one or more secondary component carriers for a carrier aggregation transmission based on at least in part on an insertion loss value for each of the multiple carriers in the network that are available for carrier aggregation transmission.

Insertion loss for a carrier is the loss in signal power resulting from the insertion of one or more devices in a transmission line. In operation, some base stations are configured with one or more RF filters, combiners, diplexers, triplexers, and other components that introduce signal loss for the carrier(s) on which the base station provides wireless service. A carrier's insertion loss is measured in decibels (dB) and always has a negative value. Because insertion loss is a function of the configuration of the filters, combiners, diplexers, triplexers, and similar components at the base station, the insertion loss for a particular carrier is a static value that can be measured and quantified.

Some embodiments may additionally or alternatively include a base station (such as an LTE eNodeB) determining that a requirement exists to transmit data between a UE and the base station via a carrier aggregation transmission, and in response to determining that a requirement exists, selecting a primary component carrier and one or more secondary component carriers for a carrier aggregation transmission based on at least in part on a combination of carrier attributes for each of the multiple carriers in the network that are available for carrier aggregation transmission, where the combination of attributes includes at least (i) each carrier's receive power at the UE, (ii) each carrier's transmit power at the base station, and (iii) each carrier's frequency.

The receive power of a carrier at a UE is the power at which the UE receives the carrier signal and is measured in watts (W) or perhaps Decibel-milliwatts (dBm). The receive power of the carrier tends to be inversely proportional to the distance of the UE from the base station radiating the carrier. For example, when the UE is closer to the base station, the carrier receive power at the UE tends to be higher, and when the UE is further from the base station, the carrier receive power at the UE tends to be lower. In operation, a UE may receive multiple carriers from one or more base stations, and the UE reports the receive power of each carrier to one or more of the base stations from which it receives the carriers. For LTE networks, the UE reports a carrier receive power for each of its received carriers to an eNodeB via one or more Channel Quality Indicator (CQI)/Channel State Information (CSI) messages.

The transmit power of a carrier at the base station is the power at which the base station transmits the carrier and is measured in watts (W) or perhaps Decibel-milliwatts (dBm). The transmit power of the carrier is a function of the configuration of the amplifiers, combiners, filters, and other components at the base station, so the transmit power a substantially static value.

As is known in the art, a carrier has a frequency and a bandwidth. The carrier's bandwidth is the difference between the highest and lower frequencies of the carrier, and the carrier's frequency (sometimes referred to as the center frequency) is the average of the higher and lower frequencies of the carrier.

Some embodiments where the base station is configured to select primary and secondary component carriers based on each carrier's receive power at the UE, each carrier's transmit power at the base station, and each carrier's frequency include the base station (i) determining a first set of two or more carriers from the carriers in the network, where each carrier in the first set has a receive power at the UE that is greater than a threshold receive power and (ii) selecting a primary component carrier and one or more secondary component carriers from the first set of two or more carriers. In such embodiments, the selected primary component carrier has the highest transmit power with the lowest frequency of the carriers in the first set, and the selected one or more secondary component carriers includes at least one secondary component carrier that has (a) a transmit power that is lower than the transmit power of the selected primary component carrier or (b) a frequency that is higher than the selected primary component carrier when the selected primary component carrier and the at least one secondary component carrier have the same transmit power.

Whether a base station is configured to select primary and secondary component carriers based on one of group delay, group delay variation, or insertion loss, or is configured to select primary and secondary component carriers based on a combination of frequency, transmit power at the base station, and receive power at the UE, depends in part on the base station and the wireless coverage area in which the base station is configured to provide wireless service.

For example, for base stations that are configured with one or more RF filters that are known to introduce group delay and group delay variation, considering group delay and/or group delay variation may be more advantageous than considering some of the other above-described carrier attributes because in such network deployments, the group delay and group delay variation introduced by the RF filters tends to be one of the more important factors for selecting primary and secondary component carriers, including selecting a higher quality and more reliable carrier for the primary component carrier.

Similarly, for base stations that are configured with one or more combiners, splitters, diplexers, and/or triplexers, considering insertion loss may be more advantageous than considering some of the other above-described carrier attributes because in such network deployments, the insertion loss introduced by the combiners, splitters, diplexer, and/or triplexers tends to be one of the more important factors for selecting primary and secondary component carriers, including selecting a higher quality and more reliable carrier for the primary component carrier.

Likewise for LTE networks configured to support inter-band carrier aggregation (i.e., combining carriers from different LTE bands), considering a combination of frequency, transmit power at the base station, and receive power at the UE may be more advantageous than considering some of the other above-described carrier attributes because, for some inter-band carrier aggregation scenarios, the frequency, base station transmit power, and UE receive power tend to be more important factors for selecting primary and secondary component carriers, and selecting a higher quality and more reliable carrier for the primary component carrier in view of differences in the frequency-dependent propagation and attenuation of carriers in different LTE bands.

After selecting the primary and secondary component carriers for the carrier aggregation transmission based on one or more of any of the above-listed carrier attributes, the base station allocates the selected primary and secondary component carriers to the carrier aggregation transmission, informs the UE of the allocation, and executes the carrier aggregation transmission according to the allocation.

This overview is illustrative only and is not intended to be limiting. In addition to the illustrative aspects, embodiments, and features described herein, further aspects, embodiments, and features will become apparent by reference to the figures and the following detailed description. The features and advantages of the disclosed systems and methods, as well as other aspects, advantages, and alternatives will become apparent to those of ordinary skill in the art by reading the following detailed description, with reference where appropriate to the accompanying drawings.

BRIEF DESCRIPTION OF THE FIGURES

FIG. 2 is a simplified diagram of a table of carrier attributes according to some embodiments of the disclosed systems and methods.

DETAILED DESCRIPTION

The systems and methods described herein are set forth only as examples. As such, those skilled in the art will appreciate that other arrangements and element (e.g., machines, interfaces, functions, orders, and groupings of functions) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For example, one or more processors executing instructions stored in memory may implement one or more of the features and functions described herein.

Figure 1:
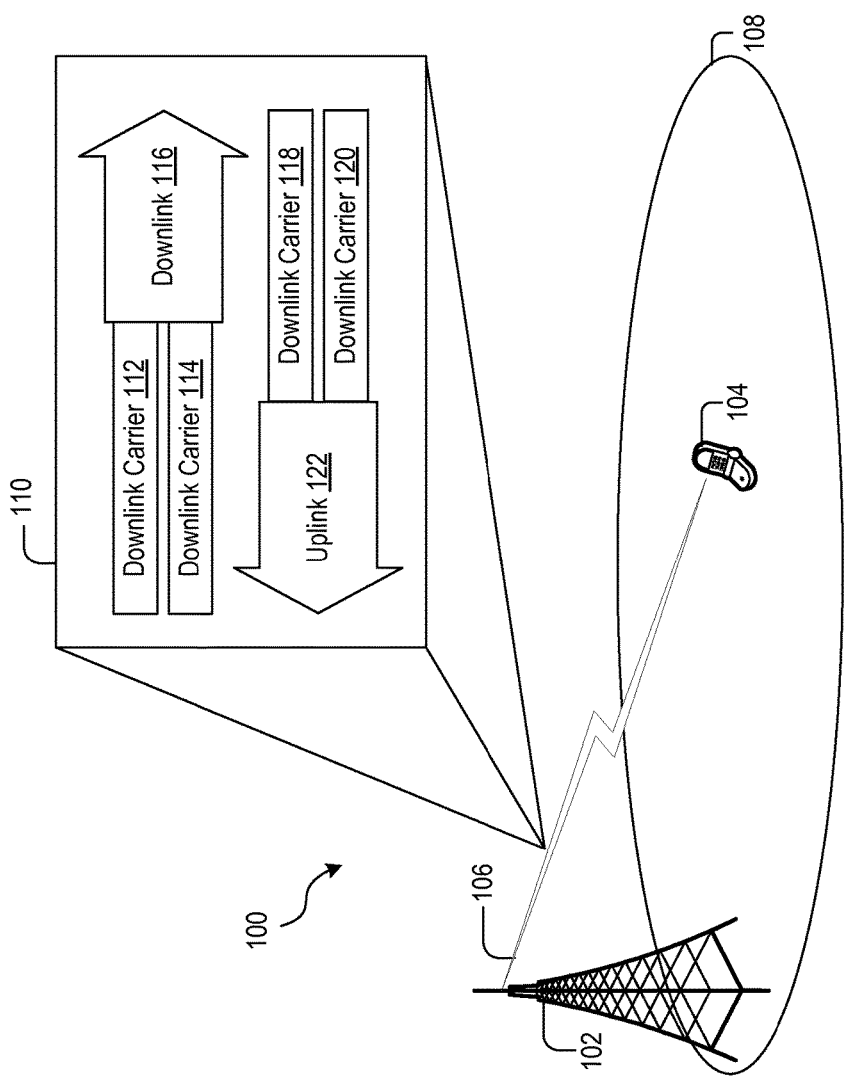
FIG. 1 is a simplified network diagram of an example wireless network configured for carrier aggregation transmissions according to embodiments of the systems and methods described herein.

FIG. 1 is a simplified network diagram of an example wireless network 100 configured for carrier aggregation transmissions according to some embodiments of the systems and methods described herein. Wireless network 100 includes a base station 102 providing wireless service to a UE 104 over a wireless communication link 106 in wireless coverage area 108.

Base station 102 may include one or more base transceiver stations (BTS), access nodes, node-Bs, eNodeBs, and/or other supporting network infrastructure for providing wireless service in wireless coverage area 108 and perhaps one or more additional wireless coverage areas (not shown). In the example shown in FIG. 1, the wireless network 100 is an LTE network and the base station 102 includes one or more eNodeBs providing service on carriers in LTE bands 25, 26, and 41. However, in other embodiments, the wireless network 100 may additionally or alternatively operate according to other wireless protocols including but not limited to any of the wireless protocols disclosed herein.

The base station 102 in wireless network 100 is configured to use carrier aggregation in wireless coverage area 108 to increase the bandwidth for transmissions between the base station 102 and the UE 104. In carrier aggregation, multiple component carriers are aggregated (or combined) to enable transmission between the base station 102 and the UE 104 at a bandwidth substantially equal to the sum of the individual bandwidths of the component carriers.

Box 110 shows a simplified diagram of an example downlink and uplink carrier aggregation configuration for communications link 108. In the example configuration shown in box 110, downlink 116 from the base station 102 to the UE 104 comprises two downlink component carriers (i.e., downlink component carrier 112 and downlink component carrier 114) from the base station 102 to the UE 104, and uplink 122 from the UE 104 to the base station 102 includes two uplink component carriers (i.e., uplink component carrier 118 and uplink component carrier 120). In an example LTE embodiment, the base station 102 uses OFDMA for downlink transmissions on the downlink 116 to the UE 104, and the UE 104 uses SC-FDMA for its uplink transmissions on the uplink 122 to the base station 102.

The example in FIG. 1 shows the downlink 116 containing two downlink component carriers and the uplink 122 containing two uplink component carriers. However, other embodiments may utilize carrier aggregation on only the uplink or only the downlink. Likewise, in some embodiments, the uplink carrier may contain more than two uplink component carriers (e.g., up to five or perhaps more uplink component carriers), and the downlink may contain more than two downlink component carriers (e.g., up to five or perhaps more downlink component carriers). Typically, a network operator decides whether a wireless network (or a base station providing wireless service in the wireless network) will employ carrier aggregation on either or both of the uplink and downlink, and if so, the number of component carriers available to aggregate for the uplink and/or downlink. In the embodiments described herein, a base station dynamically implements carrier aggregation on the uplink or downlink for carrier aggregation transmissions between the base station and a UE.

FIG. 2 is a simplified diagram of a table 200 of carrier attributes according to some embodiments of the disclosed systems and methods. In some embodiments, a base station (such as base station 102) may reference table 200 in connection with selecting a primary component carrier and one or more secondary component carriers for a carrier aggregation transmission. In operation, table 200 may be implemented in any one of multiple forms, including but not limited to a lookup table, a database, or other type or form of data structure.

The table 200 shows an example set of carriers in a network configuration having ten carriers that are available for the base station to select as primary and/or secondary component carriers for downstream carrier aggregation transmissions, including three 15 MHz carriers in LTE band 41, two 10 MHz carriers in LTE band 41, three 15 MHz carriers in LTE band 25, and two 10 MHz carriers in LTE band 26. For LTE embodiments, each base station (or perhaps base station controller configured to control a set of base stations or eNodeBs within a wireless coverage area) may have more or fewer carriers in more or fewer LTE bands to use for carrier aggregation transmissions.

Example table 200 includes a set of rows 202 that includes one row for each carrier that is available for the base station to select as a primary or secondary component carrier for a downstream carrier aggregation transmission and a set of columns 204 that includes one column for each carrier attribute on which the base station rely for selecting primary and secondary component carriers for downstream carrier aggregation transmissions. The values for the carrier attributes shown in example table 200 are for illustration purposes only and are not intended to represent an actual base station configuration or wireless network deployment.

Although table 200 shows carrier attributes for component carriers available for downstream carrier aggregation transmissions for illustration purposes, those of skill in the art would understand that example table 200 might be an excerpt from a larger table or database that contains additional carrier attributes for carriers available for upstream and downstream carrier aggregation transmissions, or that carrier attributes for additional carriers available for upstream and downstream carrier aggregation might be contained in one or more additional tables or databases (not shown). In some embodiments, the table, database, or other data structure that stores information about carriers for use with carrier aggregation transmissions may take different forms than the format depicted in example table 200.

Example table 200 includes column 206, which contains a carrier identifier for each carrier available for use by the base station for downstream carrier aggregation transmissions from the base station to the UE. For illustration purposes, table 200 shows ten carriers with carrier identifiers 1 through 10. While the carriers in example table 200 are shown with simplified carrier identifiers for ease of illustration, carrier identifiers in some embodiments may have more complex carrier identifiers. In some embodiments, each carrier may have a globally unique carrier identifier, or at least a carrier identifier that is unique within a wireless network or a wireless coverage area.

Example table 200 also includes column 208, which contains an identification of the LTE band for each carrier in table 200.

Example table 200 also includes column 210, which contains a value for the frequency in megahertz (MHz) of each carrier in table 200, and column 212, which contains an identification of the bandwidth in MHz of each carrier in table 200. Although table 200 shows carriers having certain frequencies in certain LTE bands at bandwidths of 10-15 MHz, the systems and methods used herein could be used with carriers at different frequencies and different bandwidths, including carriers of one or more kilohertz (kHz), gigahertz (GHz), or terahertz (THz) bandwidths, for example.

Column 214 in example table 200 includes a value for the group delay variation of each of the ten carriers available for carrier aggregation transmissions. Some embodiments of table 200 may additionally or alternatively include group delay. As described earlier, group delay and group delay variation are related attributes. The group delay of a carrier is a measure of a time delay of the amplitude envelopes of the various sinusoidal components (e.g., the 15 KHz subcarriers in an LTE carrier) of the carrier signal as the signal propagates through one or more RF filters at the base station. Group delay variation is the difference between the time delays of the subcarrier components of the carrier as those subcarrier components traverse one or more RF filters at the base station. For LTE embodiments, group delay variation between subcarriers of a single LTE resource block and subcarriers of adjacent LTE resource blocks tend to cause signal distortions that often reduce carrier signal quality and reliability. Group delay and group delay variation in wireless transmission systems is typically measured in nanoseconds, but group delay and group delay variation could be measured in different time units in other types of transmissions systems. As noted above, because group delay and group delay variation is largely a function of the RF filter configuration at the base station, the group delay and group delay variation of a particular carrier is a static value that can be measured, quantified, and stored in table 200 or other data structure.

Column 216 in example table 200 includes a value for the insertion loss of each of the ten carriers available for downstream carrier aggregation transmissions. Insertion loss for a carrier is the loss in signal power resulting from the insertion of one or more devices in a transmission line. In operation, some base stations are configured with one or more RF filters, splitters, combiners, diplexers, triplexers, and other components that introduce signal loss for the carrier(s) on which the base station provides wireless service. A carrier's insertion loss is measured in decibels (dB) and always has a negative value. Because insertion loss is a function of the configuration of filters, splitters, combiners, diplexers, triplexers, and similar components at the base station, the insertion loss for a particular carrier is a static value that can be measured, quantified, and stored in table 200 or other data structure.

Column 218 in example table 200 includes a value for the transmit power of each of the ten carriers available for carrier aggregation transmission. The transmit power of a carrier at the base station is the power at which the base station transmits the carrier and is typically measured in watts (W) or perhaps dBm. The transmit power of the carrier is a function of the configuration of the amplifiers, combiners, filters, and other components at the base station, so the transmit power tends to be a relatively stable value. But in some embodiments, the transmit power at the base station may be dynamic or otherwise change over time. In such embodiments, the base station may be configured to consider the most recent value for the transmit power, an average transmit power over some defined duration of time, or some other characterization of the carrier transmit power at the base station. In some embodiments, the base station uses the transmit power for each of the carriers at the base station in combination with the receive power for each of the carriers at the UE (not shown) to select the primary and secondary component carriers.

The receive power of a carrier at the UE is the power at which the UE receives the carrier signal and is measured in watts (W). The receive power of a carrier at the UE varies as a function of the UE's location, and tends to be inversely proportional to the distance of the UE from the base station radiating the carrier. For example, when the UE is closer to the base station, the carrier receive power at the UE tends to be higher, and when the UE is further from the base station, the carrier receive power at the UE tends to be lower. Unlike group delay, group delay variation, insertion loss, the receive power of each carrier received at the UE changes frequently, for example, as the UE moves around within the wireless coverage area or from wireless coverage area to wireless coverage area.

In operation, a UE may receive multiple carriers from one or more base stations, and in some embodiments, the UE reports the receive power of each received carrier to one or more of the base stations from which it receives the carriers. For LTE networks, the UE reports a carrier receive power for each of its received carriers to an eNodeB (typically the eNodeB with which the UE is attached or registered) via one or more Channel Quality Indicator (CQI)/Channel State Information (CSI) messages. In other embodiments, a UE or other wireless communication device may use different messaging or signaling to report carrier receive power to a base station, head end, or similar network controller element.

Assuming two different carriers with the same transmit power at two different frequencies, the carrier at the lower frequency will propagate further than the carrier at the higher frequency. In some instances, a lower frequency carrier transmitted at a lower transmit power from the base station may nevertheless have a higher receive power measured at the UE as compared to a higher frequency carrier transmitted at a higher power from the base station. Therefore, by considering the receive power of each carrier at the UE, the base station can account for frequency-dependent propagation and signal attenuation differences between carriers when selecting primary and secondary component carriers for carrier aggregation transmissions.

In some example embodiments, a base station is configured to select primary and secondary component carriers from a set of available carriers based at least in part on one or more of (i) each carrier's frequency (table 200, column 212), (ii) each carrier's group delay variation value (table 200, column 214), (iii) each carrier's group delay value (not shown), (iv) each carrier's insertion loss value (table 200, column 216), and/or (v) each carrier's transmit power at the base station (table 200, column 218). In some embodiments, the base station is configured to additionally consider each carrier's receive power measured at the UE (not shown) in combination with each carrier's transmit power at the base station and frequency. In some embodiments, the base station may consider each carrier's receive power measured at the UE in combination with each carrier's transmit power at the base station and one or more of each carrier's frequency, group delay, group delay variation, and/or insertion loss.

Some embodiments may additionally include the base station determining whether the UE supports carrier aggregation transmission, and if so, the number of carriers the UE supports (e.g., two, three, four, or five carriers, or perhaps more in the future), or perhaps the particular carriers that the UE supports for carrier aggregation transmissions. For LTE embodiments, the base station may additionally determine which LTE bands the UE supports, whether the UE supports contiguous and/or non-contiguous carrier aggregation, whether the UE supports inter-band and/or intra-band carrier aggregation, and any other limitations or restrictions on the UE's carrier aggregation capabilities (e.g., the maximum bandwidth of a carrier aggregation transmission that the UE can support, or particular carriers that the UE cannot use for carrier aggregation transmissions).

In some embodiments, the UE informs the base station about the UE's carrier aggregation capabilities (and perhaps limitations) via messaging sent from the UE to the base station when the UE registers or attaches with the base station. In one example, the UE has a profile record that the base station receives from the UE (or perhaps from another network element) when the UE registers or attaches with the base station. The base station can then use the information about the UE's carrier aggregation capabilities and/or limitations when selecting primary and secondary component carriers for carrier aggregation transmissions between the base station and the UE.

In one example embodiment, in a wireless network (e.g., network 100 in FIG. 1) having a plurality of carriers available for carrier aggregation transmissions, the base station determines that a requirement exists to transmit data between a UE and the base station via a carrier aggregation transmission. In operation, the base station may determine the existence of the requirement to transmit data between the UE and the base station via carrier aggregation in multiple ways, including but not limited to, for example, (i) a request received by the base station from the UE (or perhaps from another network element) for the UE to transmit data on the uplink to the base station (e.g., to send an email with an attachment, to send streaming video from the UE, to perform a file transfer, or some other type of communication session) and/or (ii) a request received by the base station from the UE (or perhaps from another network element) for the UE to receive data on the downlink to the UE (e.g., to receive an email with an attachment, to receive streaming video, to perform a file transfer).

In some embodiments, in response to determining the requirement to transmit data via a carrier aggregation transmission, the base station selects a primary component carrier and one or more secondary component carriers for the carrier aggregation transmission based at least in part on the value of each available carrier's group delay variation or perhaps group delay.

For example, table 200 shows ten carriers available for downstream carrier aggregation transmissions, and if the base station determines a requirement for a downstream carrier aggregation transmission using four carriers (and that the UE supports a carrier aggregation transmission using four carriers), then in some embodiments, the base station will: (i) select carrier 2 with a 22 ns group delay variation as the primary component carrier because carrier 2 has the lowest group delay variation of the carriers in the plurality of carriers; (ii) select carrier 3 with a 52 ns group delay variation as the first secondary component carrier because carrier 3 has the second-lowest group delay variation; (iv) select carrier 4 with a 66 ns group delay variation as the second secondary component carrier because carrier 4 has the third-lowest group delay variation; and (v) select carrier 7 with a 69 ns group delay variation as the third secondary component carrier because carrier 7 has the fourth-lowest group delay variation. This example assumes that the UE supports inter-band carrier aggregation with LTE Bands 41 and 25, but if the UE does not support inter-band carrier aggregation with LTE Bands 41 and 25 (based on the UE's self-reported carrier aggregation capabilities), then the base station may select carrier 1 rather than carrier 7 for the third secondary component carrier for the carrier aggregation transmission.

In an example where the carriers in LTE Band 41 are not available for carrier aggregation transmissions between the UE and the base station for some reason, (e.g., traffic loading on those carriers is above some threshold or the UE is too far away from the base station to receive the band 41 carriers based on the carrier receive powers at the UE reported by the UE to the base station), then the base station might instead: (i) select carrier 7 with a 69 ns group delay variation as the primary component carrier because carrier 7 has the lowest group delay of the carriers that are currently available for carrier aggregation transmissions between the base station and the UE; (ii) select carrier 9 with a 100 ns group delay variation as the first secondary component carrier because carrier 9 has the second-lowest group delay of the carriers that are currently available for carrier aggregation transmissions between the base station and the UE; (iii) select carrier 6 with a 120 ns group delay variation as the second secondary component carrier because carrier 6 has the third-lowest group delay of the carriers that are currently available for carrier aggregation transmissions between the base station and the UE; and (iv) select carrier 10 with a 120 ns group delay variation as the third secondary component carrier because carrier 10 has the fourth-lowest group delay of the carriers that are currently available for carrier aggregation transmissions between the base station and the UE.

Although carrier 6 and carrier 10 have the same 120 ns group delay variation, in some embodiments, the base station may be configured to consider other carrier attributes (e.g., frequency, insertion loss, transmit power, or perhaps carrier receive power at the UE) in combination with group delay variation to select one available carrier as a primary or secondary component carrier versus another. In this example, the base station considers insertion loss (table 200, column 214) and selects carrier 6 as the second secondary component carrier because the −0.38 dB insertion loss of carrier 6 is less than the −0.64 dB insertion loss of carrier 10. In another example, the base station may consider each carrier's frequency and select carrier 10 as the secondary component carrier because the 875.10 MHz frequency of carrier 10 is lower than the 1942.50 MHz frequency of carrier 6.

This example assumes that the UE supports inter-band carrier aggregation with LTE Bands 25 and 26, but if the UE does not support inter-band carrier aggregation with LTE Bands 25 and 26 (based on the UE's self-reported carrier aggregation capabilities), then the base station may: (i) select carrier 7 as the primary component carrier because carrier 7 has the lowest group delay of the carriers that are currently available for carrier aggregation transmissions between the base station and the UE; (ii) select carrier 6 as the secondary component carrier because carrier 6 has the second-lowest group delay of the carriers that are currently available for carrier aggregation transmissions between the base station and the UE, and (iii) then proceed with a carrier aggregation transmission comprising two component carriers rather than four component carriers because only two carriers are currently available for carrier aggregation transmissions between the base station and the UE.

In each of the above-described examples where the base station selects primary and secondary component carriers based at least in part on group delay variation (table 200, column 212), the value of the group delay variation for the selected primary component carrier is less than the value of the group delay variation for each of the selected secondary component carriers.

In further embodiments, in response to determining the requirement to transmit data via a carrier aggregation transmission, the base station selects a primary component carrier and one or more secondary component carriers for the carrier aggregation transmission based at least in part on the value of each available carrier's insertion loss.

For example, table 200 shows ten carriers available for downstream carrier aggregation transmissions, and if the base station determines a requirement for a downstream carrier aggregation transmission using four carriers (and that the UE supports a carrier aggregation transmission using four carriers), then in some embodiments, the base station will: (i) select carrier 5 with a −0.31 dB insertion loss as the primary component carrier because carrier 5 has the lowest insertion loss of the carriers that are currently available for carrier aggregation transmissions between the base station and the UE; (ii) select carrier 6 with a −0.38 dB insertion loss as the first secondary component carrier because carrier 6 has the second-lowest insertion loss of the carriers that are currently available for carrier aggregation transmissions between the base station and the UE; (iii) select carrier 9 with a −0.45 dB insertion loss as the second secondary component carrier because carrier 9 has the third-lowest insertion loss of the carriers that are currently available for carrier aggregation transmissions between the base station and the UE; and (iv) select carrier 8 with a −0.45 dB insertion loss as the third secondary component carrier because carrier 8 has the fourth-lowest insertion loss of the carriers that are currently available for carrier aggregation transmissions between the base station and the UE.

Although carriers 8 and 9 have the same insertion loss, in some embodiments, the base station may consider other carrier attributes in combination with insertion loss to select one component carrier for a primary or secondary component carrier versus another. In this example, the base station considers the group delay variation of the carriers and selects carrier 9 as the second secondary component carrier and carrier 8 as the third secondary component carrier because the 100 ns group delay variation of carrier 9 is less than the 160 ns group delay variation of carrier 8. In another example, the base station may consider each carrier's frequency and select carrier 9 as the secondary component carrier because the 865.00 MHz frequency of carrier 9 is lower than the 1972.70 MHz frequency of carrier 8.

This example assumes that the UE supports inter-band carrier aggregation with LTE Bands 41, 25, and 26 but if the UE does not support inter-band carrier aggregation with LTE Bands 41, 25, and 26 (based on the UE's self-reported carrier aggregation capabilities), then the base station may select different carriers for the carrier aggregation transmission based on the UE's carrier aggregation capabilities. For example, if the UE supports inter-band carrier aggregation only with LTE Bands 41 and 25, then the base station may instead select carriers for the primary and secondary component carriers that are within LTE Bands 41 and 25. Or if the UE supports inter-band carrier aggregation only with LTE Bands 41 and 26, then the base station may instead select carriers for the primary and secondary component carriers that are within LTE Bands 41 and 26.

In an example where the carriers in LTE Band 41 are not available for carrier aggregation transmissions between the UE and the base station for some reason, (e.g., traffic loading on those carriers is above some threshold or the UE is too far away from the base station to receive the band 41 carriers based on the carrier receive powers at the UE reported by the UE to the base station), then the base station might instead: (i) select carrier 6 with a −0.38 dB insertion loss as the primary component carrier because carrier 6 has the lowest insertion loss of the carriers that are currently available for carrier aggregation transmissions between the base station and the UE; (ii) select carrier 9 with a −0.45 dB insertion loss as the first secondary component carrier because carrier 9 has the second-lowest insertion loss of the carriers that are currently available for carrier aggregation transmissions between the base station and the UE; (iii) select carrier 8 with a −0.45 dB insertion loss as the second secondary component carrier because carrier 8 has the third-lowest insertion loss of the carriers that are currently available for carrier aggregation transmissions between the base station and the UE; and (iv) select carrier 7 with a −0.47 dB insertion loss as the third secondary component carrier because carrier 7 has the fourth-lowest insertion loss of the carriers that are currently available for carrier aggregation transmissions between the base station and the UE.

Although carrier 8 and carrier 9 have the same −0.45 dB insertion loss, in some embodiments, the base station may be configured to consider other carrier attributes (e.g., frequency, group delay, group delay variation, transmit power, or perhaps carrier receive power at the UE) in combination with insertion loss to select a component carriers as a primary or secondary component carrier versus another.

In this example, the base station considers group delay variation (table 200, column 212) and selects carrier 9 as the first secondary component carrier because the 100 ns group delay variation of carrier 9 is less than the 160 ns group delay variation of carrier 8. However, in other examples, the base station may consider another carrier attribute instead of group delay variation to decide between two carriers with the same insertion loss. For example, in this instance, the base station may consider each carrier's receive power at the UE, and select carrier 8 over carrier 9 (or vice versa) based on which of the two carriers has the higher receive power at the UE.

In each of the above-described examples where the base station selects primary and secondary component carriers based at least in part on insertion loss (table 200, column 214), the value of the insertion loss for the selected primary component carrier is less than the value of the insertion loss for each of the selected secondary component carriers.

In still further embodiments, in response to determining the requirement to transmit data via a carrier aggregation transmission, the base station selects a primary component carrier and one or more secondary component carriers for the carrier aggregation transmission based at least in part on the value of each available carrier's transmit power at the base station.

For example, table 200 shows ten carriers available for downstream carrier aggregation transmissions, and if the base station determines a requirement for a downstream carrier aggregation transmission using four carriers (and that the UE supports a carrier aggregation transmission using four carriers), then in some embodiments, the base station will select four carriers from carriers 1-5 in LTE Band 41 because all five of carriers 1-5 in LTE Band 41 have the highest transmit power at the base station (i.e., 30 W) of the carriers that are available for carrier aggregation transmissions between the base station and the UE.

Although carriers 1-5 have the same transmit power, in some embodiments, the base station may consider other carrier attributes in combination with transmit power to select one component carrier for a primary or secondary component carrier versus another.

For example, if the base station uses group delay variation to select the primary and secondary component carriers from the set of carriers having the highest transmit power at the base station, then the base station: (i) selects carrier 2 with a 22 ns group delay variation as the primary component carrier because carrier 2 has the lowest group delay variation of the carriers having the highest transmit power at the base station; (ii) selects carrier 3 with a 52 ns group delay variation as the first secondary component carrier because carrier 3 has the second-lowest group delay variation of the carriers having the highest transmit power at the base station; (iii) selects carrier 4 with a 66 ns group delay variation as the second secondary component carrier because carrier 4 has the third-lowest group delay variation of the carriers having the highest transmit power at the base station; and (iv) selects carrier 1 with a 153 ns group delay variation as the third secondary component carrier because carrier 1 has the fourth-lowest group delay variation of the carriers having the highest transmit power at the base station.

Alternatively, if the base station uses insertion loss to select the primary and secondary component carriers from the set of carriers having the highest transmit power at the base station, then the base station: (i) selects carrier 5 with a −0.31 dB insertion loss as the primary component carrier because carrier 5 has the lowest insertion loss of the carriers having the highest transmit power at the base station; (ii) selects carrier 4 with a −0.44 dB insertion loss as the first secondary component carrier because carrier 4 has the second-lowest insertion loss of the carriers having the highest transmit power at the base station; (iii) selects carrier 3 with a −0.50 dB insertion loss the second secondary component carrier because carrier 3 has the third-lowest insertion loss of the carriers having the highest transmit power at the base station; and (iv) selects carrier 1 with a −0.56 dB insertion loss as the third secondary component carrier because carrier 1 has the fourth-lowest insertion loss of the carriers having the highest transmit power at the base station.

In other alternative embodiments, the base station may additionally or alternatively consider frequency or carrier receive power at the UE to select the primary and secondary component carriers from the set of carriers having the highest transmit power at the base station in a manner similar to that described above with respect to group delay variation.

In an example where the carriers in LTE Band 41 are not available for carrier aggregation transmissions between the UE and the base station for some reason, (e.g., traffic loading on those carriers is above some threshold or the UE is too far away from the base station to receive the band 41 carriers based on the carrier receive powers at the UE reported by the UE to the base station), then the base station might prioritize the component carriers first by transmit power, and when two carriers have the same transmit power, prioritize the component carriers next by group delay variation.

In this example, the base station: (i) selects carriers 7 as the primary component carrier, carrier 6 as the first secondary component carrier, and carrier 8 as the second secondary component carrier because carriers 6, 7, and 8 all have the highest transmit power (25 W), but the 69 ns group delay variation of carrier 7 is the lowest group delay variation of the carriers with the highest transmit power, the 120 ns group delay variation of carrier 6 is the second-lowest group delay variation of the carriers with the highest transmit power, and the 160 ns group delay variation of carrier 8 is the third-lowest group delay variation of the carriers with the highest transmit power, and (ii) select carrier 9 as the third secondary component carrier because carriers 9 and 10 both have the next-highest transmit power (i.e., 20 W), the 100 ns group delay variation of carrier 9 is less than the 120 ns group delay variation of carrier 10.

This example assumes that the UE supports inter-band carrier aggregation with LTE Bands 25 and 26 but if the UE does not support inter-band carrier aggregation with LTE Bands 25 and 26 (based on the UE's self-reported carrier aggregation capabilities), then the base station may select different carriers for the carrier aggregation transmission based on the UE's carrier aggregation capabilities. For example, if the UE only supports intra-band carrier aggregation within LTE Band 25, then the base station may instead select carriers for the primary and secondary component carriers that are within LTE Band 25. Or if the UE supports only supports intra-band carrier aggregation within LTE Band 26, then the base station may instead select carriers for the primary and secondary component carriers that are within LTE Band 26. And within LTE Bands 25 or 26, the base station may consider frequency, group delay, group delay variation, insertion loss, and/or receive power at the UE to select primary and secondary component carriers for the carrier aggregation transmission.

In some embodiments, the base station is configured to select a primary component carrier and one or more secondary component carriers based on a combination of (i) each carrier's receive power at the UE, (ii) each carrier's transmit power at the base station, and (iii) each carrier's frequency.

For example, table 200 shows ten carriers available for downstream carrier aggregation transmissions. In some embodiments where the base station considers each carrier's receive power at the UE, transmit power at the base station, and frequency, the base station first determines a first set of two or more carriers from the ten carriers (table 200) that have a receive power at the UE that is greater than a threshold receive power. In operation, the threshold receive power is a receive power at which the UE can reliably receive the carrier at a sufficiently good quality. In practice, the threshold receive power for one UE may be different than the threshold receive power for another UE in part because of hardware and/or software differences between the UEs, such as different antenna and amplifier configurations or perhaps different signal processing capabilities.

Although not shown in table 200, this example assumes that (i) the receive power at the UE of all the carriers in LTE Bands 25 and 26 is greater than the threshold receive power but (ii) the receive power at the UE of all five carriers in LTE Band 41 is not greater than the threshold receive power for the UE. This may occur in a situation where the UE is close enough to the base station to receive the lower frequency carriers in LTE Bands 25 and 26, but too far away from the base station to receive the higher frequency band 41 carriers at a sufficiently high receive power. Therefore, in this example, the first set of two or more carriers (i.e., where each carrier has a receive power at the UE that is greater than the threshold receive power) includes carriers 6-10 but does not include carriers 1-5.

After determining the first set of two or more carriers from the ten carriers having a receive power at the UE that is greater than a threshold receive power (i.e., carriers 6-10), the base station then selects a primary component carrier and one or more secondary component carriers from the first set of two or more carriers. In some embodiments, the base station selects the primary component carrier based on the carrier transmit power and frequency.

In some embodiments where the base station selects the primary component carrier and one or more secondary component carriers from the first set of two or more carriers based first on transmit power and then on frequency: (i) the selected primary component carrier has the highest transmit power with the lowest frequency of the carriers in the first set; (ii) the selected first secondary component carrier has either (a) a transmit power that is lower than the transmit power of the selected primary component carrier or (b) a frequency that is higher than the selected primary component carrier when the selected primary component carrier and first secondary component carrier have the same transmit power; and (iii) the selected second secondary component carrier has either (a) a transmit power that is lower than the transmit power of the selected first secondary component carrier or (b) an operating frequency that is higher than the selected first secondary component carrier when the selected secondary component carrier and first secondary component carrier have the same transmit power.

For example, with reference to table 200, the base station: (i) selects carrier 6 as the primary component carrier, carrier 7 as the first secondary component carrier, and carrier 8 as the second secondary component carrier because carriers 6, 7, and 8 all have the highest transmit power (25 W), but carrier 6 has the lowest frequency (1942.5 MHz) of the carriers with the highest transmit power in the first set (i.e., the carriers having a receive power at the UE greater than a threshold receive power), carrier 7 has the second-lowest frequency (1957.6 MHz) of the carriers with the highest transmit power in the first set, and carrier 8 has the third-lowest frequency (1972.7 MHz) of the carriers with the highest transmit power in the first set, and (ii) selects carrier 9 as the third secondary component carrier because, although carriers 9 and 10 both have the next-highest transmit power (i.e., 20 W), carrier 9 has a lower frequency (865 MHz) than carrier 10 (875.1 MHz).

In still further embodiments, the base station may be configured to select primary and secondary component carriers based on one or more of each carrier's frequency (table 200, column 210), bandwidth (table 200, column 212), group delay (not shown), group delay variation (table 200, column 214), insertion loss (table 200, column 216), transmit power at the base station (table 200, column 218, and/or receive power at the UE (not shown), or perhaps any of the above-listed carrier attributes in combination with other factors.

Figure 3:
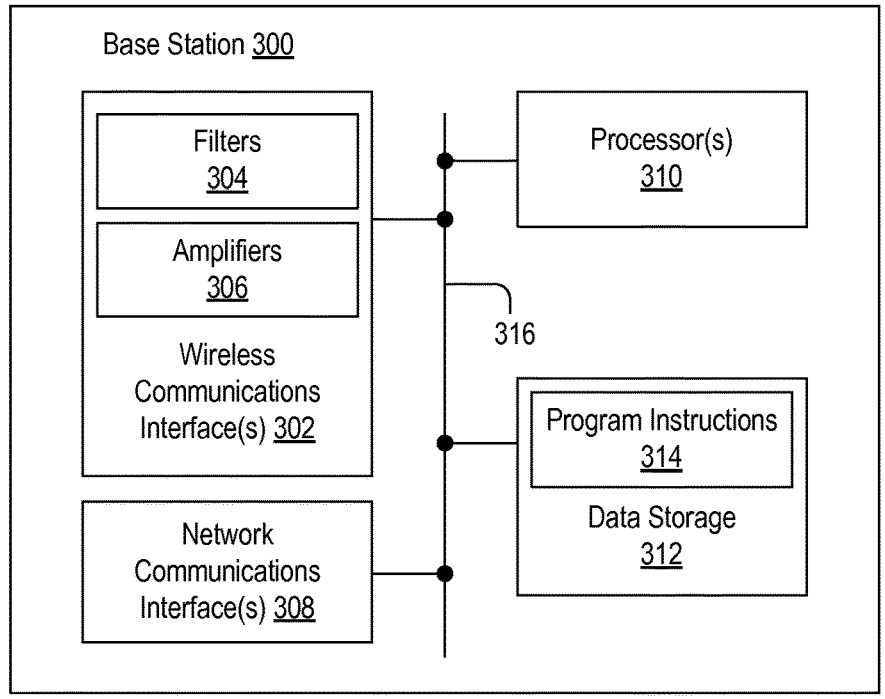
FIG. 3 is a simplified block diagram of an example base station according to some embodiments of the disclosed systems and methods.

FIG. 3 is a simplified block diagram of an example base station 300 according to some embodiments of the disclosed systems and methods, including, for example, base station 102 of FIG. 1. It will be appreciated that there can be numerous specific implementations of a base station, such as base station 300, in which the disclosed methods for selecting primary and secondary component carriers for carrier aggregation transmissions could be implemented. As such, base station 300 is representative of a means for carrying out methods selecting primary and secondary component carriers for carrier aggregation transmissions, in accordance with the methods and steps described herein by way of example.

The example base station 300 includes one or more wireless communications interfaces 302, one or more network communications interfaces 308, one or more processors 310, and tangible, non-transitory, computer-readable data storage 312, all of which may be coupled together by a system bus 316 or similar mechanism. In addition, the base station 300 may also include external storage, such as magnetic or optical disk storage (not shown). Variations from this arrangement are possible as well, including addition and/or omission of components, combination of components, and distribution of components in any of a variety of ways.

The base station components may be arranged to support wireless communications in a wireless communication network that is compliant with one or more of the variety of wireless air-interface protocols noted herein, in addition to other protocols now known or later developed. In particular, the components of the example base station 300 are configured to implement methods for selecting primary and secondary component carriers for carrier aggregation transmissions in accordance with the example embodiments described herein.

The one or more wireless communications interfaces 302 may include one or more transmitters, receivers, transceivers, amplifiers 306, filters 304, antennas, and other associated components that enable the base station 300 to engage in air interface communication with one or more wireless communications devices, such as UE 104 shown in FIG. 1, according to any of the air interface protocols described herein (e.g., CDMA, GSM, LTE) and perhaps others (e.g., WiFi, Bluetooth). The one or more amplifiers 306 and filters 304 are configured to support transmissions, including carrier aggregation transmissions, on (1) the downlink (or forward link) from the base station 300 to a UE and (2) the uplink (or reverse link) from the UE to the base station 300.

The one or more network interfaces 308 include physical network interfaces (e.g., optical, electrical, wireless) that enable the base station 300 to send and receive traffic directly or indirectly to/from other networks, such as the Public Switched Telephone Network (PSTN), the Internet, and/or other networks. The one or more network interfaces 308 may take the form of Ethernet network interface cards/ports, optical network interface cards/ports or other physical interfaces to one or more transmission networks that directly or indirectly connect the base station 300 to its neighboring base stations as well as to the PSTN, the Internet, and/or other networks.

The one or more processors 310 comprise one or more general-purpose processors (e.g., microprocessors) and/or one or more special-purpose processors (e.g., dedicated digital signal processors (DSPs), application specific integrated circuits (ASICs)). In some embodiments, the one or more processors 310 may be integrated in whole or in part with one or more other components, e.g., the wireless communication interfaces 302 and/or the network communication interfaces 308.

The tangible, non-transitory, computer-readable data storage 312 comprises one or more volatile and/or non-volatile storage components, such as magnetic, optical, or flash memory or disk storage. Tangible, non-transitory data, computer-readable data storage 312 can be integrated in whole or in part with the one or more processors 310, wireless communication interface(s) 302, and/or network communication interfaces(s) 308, as cache memory or registers for instance. The tangible, non-transitory data storage 312 may hold (e.g., contain, store, or otherwise be encoded with) program instructions 314 (e.g., machine language instructions or other program logic, markup or the like) executable by the one or more processors 310 to carry out one or more of the various functions described herein, including but not limited to functions relating to the base station's selection of primary and secondary component carriers for carrier aggregation transmissions. The tangible, non-transitory data storage 312 may also hold reference data for use by the base station in selecting primary and secondary component carriers for carrier aggregation transmissions, including but not limited to one or more tables or databases of carrier attributes and/or performance data like the table 200 shown and described with reference to FIG. 2 and perhaps other information, such as carrier receive powers for carriers reported by UEs in communication with the base station.

Figure 4:
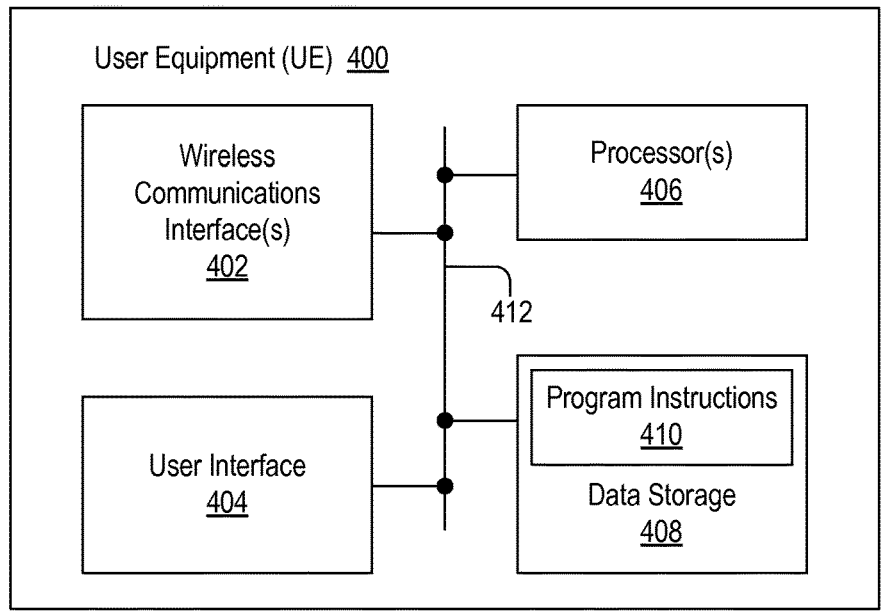
FIG. 4 is a simplified block diagram of an example UE according to some embodiments of the disclosed systems and methods.

FIG. 4 is a simplified block diagram of a UE 400 according to some embodiments of the disclosed systems and methods, including, for example, UE 104 shown in FIG. 1. The UE 400 is configured to operate in a communication system, such as the wireless communication system 100 of FIG. 1 for example, and may execute one or more functions described herein.

The UE 400 includes one or more wireless communication interfaces 402, one or more processors 406, a user interface 404, and tangible, non-transitory computer-readable data storage 408 configured to store program instructions 410, all of which may be communicatively linked together by a system bus 412 or other similar mechanism. Variations from this arrangement are possible as well, including addition and/or omission of components, combination of components, and distribution of components in any of a variety of ways.

Wireless communication interface(s) 402 includes components (e.g., radios, antennas, communications processors) configured to engage in air interface communication on one or more wireless carriers, including transmitting and receiving data between the UE and a base station via carrier aggregation transmissions. For example, the wireless communication interface 402 may include one or more antenna structures and chipsets arranged to support wireless communication, including carrier aggregation transmissions as described herein, according to one or more air interface protocols, such as the ones disclosed and described herein (e.g., CDMA, GSM, LTE) and perhaps others (e.g., WiFi, Bluetooth, etc.).

The one or more processors 406 include one or more general purpose processors (e.g., microprocessors) and/or special purpose processors (e.g., application specific integrated circuits or the like). In some embodiments, the one or more processors 406 may be integrated in whole or in part with the one or more wireless communication interfaces 402.

The tangible, non-transitory, computer-readable data storage 408 comprises one or more volatile and/or non-volatile storage components. The storage components may include one or more magnetic, optical, and/or flash memory components and/or perhaps disk storage for example. In some embodiments, the tangible, non-transitory data storage 408 may be integrated in whole or in part with the one or more processors 406 and/or the wireless communication interface (s) 402. Additionally or alternatively, the tangible, non-transitory data storage 408 may be provided separately as a tangible, non-transitory machine readable medium.

The tangible, non-transitory data storage 408 may hold (e.g., contain, store, or otherwise be encoded with) program instructions 410 (e.g., machine language instructions or other program logic, markup or the like) executable by the one or more processors 406 to carry out one or more of the various functions described herein, including but not limited to functions relating to the setup and execution of carrier aggregation transmissions via primary and secondary component carriers as described herein. The tangible, non-transitory data storage 408 may also hold reference data for use in setting up and executing carrier aggregation transmissions via primary and secondary component carriers as described herein.

Figure 5:
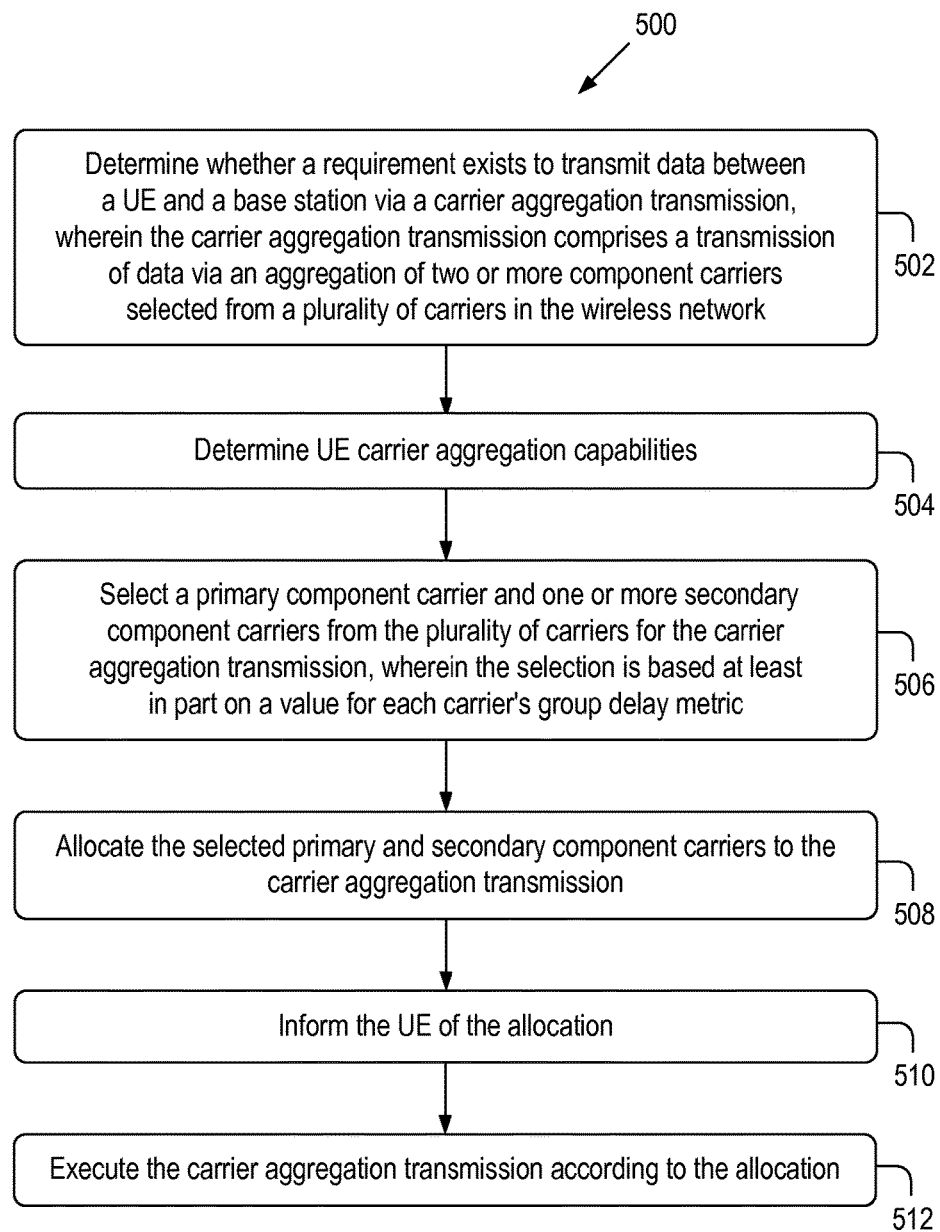
FIG. 5 is a flow chart depicting aspects of an example method implemented by a base station for selecting primary and secondary component carriers for carrier aggregation transmissions based on carrier group delay values according to some embodiments of the disclosed systems and methods.

FIG. 5 is a flow chart depicting aspects of an example method 500 implemented by a base station for selecting primary and secondary component carriers for carrier aggregation transmissions based at least in part on carrier group delay values according to embodiments of the disclosed systems and methods. In operation, method 500 is performed by or for any base station or similar network element in a multiple-access transmission network comprising a plurality of carriers, where each carrier has a group delay value. In some embodiments, method 500 may be implemented by a base station such as any of the base stations disclosed and described herein, including but not limited to base stations 102 and 300 shown and described with reference FIGS. 1 and 3, respectively. Some example embodiments are described with reference to LTE wireless networks, but features and functions of method 500 are equally applicable to other multiple access networks that are configured for carrier aggregation transmissions.

Method 500 begins at block 502, where a base station determines that a requirement exists to transmit data between a UE and the base station via a carrier aggregation transmission, wherein the carrier aggregation transmission comprises a transmission of data via an aggregation of two or more component carriers selected from the plurality of carriers in the wireless network.

As noted above, the base station may determine the existence of the requirement to transmit data between the UE and the base station via carrier aggregation in multiple ways, including but not limited to, for example, (i) a request received by the base station from the UE (or perhaps from another network element) for the UE to transmit data on the uplink to the base station (e.g., to send an email with an attachment, to send streaming video from the UE, to perform a file transfer, or some other type of communication session) and/or (ii) a request received by the base station from the UE (or perhaps from another network element) for the UE to receive data on the downlink to the UE (e.g., to receive an email with an attachment, to receive streaming video, to perform a file transfer).

Next, method 500 advances to block 504, where the base station determines the UE's carrier aggregation capabilities. In some embodiments, the base station determines whether the UE supports carrier aggregation transmission, and if so, the number of carriers the UE supports for carrier aggregation transmissions (e.g., two, three, four, or five carriers, or perhaps more in the future). For LTE embodiments, the base station may also determine which LTE bands the UE supports, whether the UE supports contiguous and/or non-contiguous carrier aggregation, whether the UE supports inter-band and/or intra-band carrier aggregation, and any other limitations or restrictions on the UE's carrier aggregation capabilities (e.g., the maximum bandwidth of a carrier aggregation transmission that the UE can support).

In some embodiments, the UE informs the base station about the UE's carrier aggregation capabilities via messaging sent from the UE to the base station when the UE registers or attaches with the base station or perhaps other messaging. Additionally or alternatively, the base station may learn the UE's carrier aggregation capabilities in other ways, such as from a network provided UE profile record, for example.

Once the base station has determined the UE's carrier aggregation capabilities (and/or limitations), the base station can then use the information about the UE's carrier aggregation capabilities when selecting primary and secondary component carriers for carrier aggregation transmissions between the base station and the UE. In some LTE embodiments, the UE and base station may both be capable of carrier aggregation transmissions that include (i) multiple contiguous carriers in one LTE band, (ii) multiple non-contiguous carriers in one LTE band, or (iii) multiple non-contiguous carriers in different LTE bands.

At block 506, and in response to determining that the requirement exists to transmit data between the UE and a base station via a carrier aggregation transmission in block 502 (and based on the UE's carrier aggregation capabilities determined in block 504), the base station selects a primary component carrier and one or more secondary component carriers for the carrier aggregation transmission, wherein the selection is based at least in part on a value for each carrier's group delay metric. In some embodiments, each carrier's group delay metric is stored in a table, database, or other data structure, such as table 200 (FIG. 2) for example. In such embodiments, block 506 includes accessing the table, database, or other data structure to obtain carrier attributes (e.g., each carrier's group delay metric (i.e., group delay and/or group delay variation), insertion loss, and/or transmit power at the base station) to use those carrier attributes as basis for selecting the primary and secondary component carriers for the carrier aggregation transmission.

In operation, the base station selects the primary component carrier and the one or more secondary component carriers from the plurality of carriers in the network, or at least from a subset of carriers in the network that have been designated or determined as available for carrier aggregation transmissions. For example, the UE's carrier aggregation capabilities (block 504) may limit which carriers the UE supports for carrier aggregation (e.g., in LTE embodiments, the bands in which the UE supports carrier aggregation and whether the UE supports contiguous, non-contiguous, inter-band, and/or intra-band carrier aggregation). In some embodiments, the base station may exclude certain carriers from consideration as primary or secondary component carriers for a carrier aggregation transmission between the UE and the base station based on the UE's reported carrier aggregation capabilities.

In some embodiments, each carrier's group delay metric may be the value of each carrier's group delay. In other embodiments, each carrier's group delay metric may be the value of each carrier's group delay variation.

In some embodiments, the value of the group delay metric of the primary component carrier selected at block 506 is less than the value of the group delay metric of each of the one or more secondary component carriers selected at block 506. For example, the base station uses each carrier's group delay metric as a basis for selecting the primary and secondary component carriers from the available component carriers for the carrier aggregation transmission, and (i) selects the carrier with the lowest group delay variation as the primary component carrier, (ii) selects the carrier with the second-lowest group delay variation as the first secondary component carrier, and (iii) selects subsequent secondary component carriers having the next-lowest group delay variation values in a similar fashion. In such embodiments, the primary component carrier selected at block 506 has the lowest value for the group delay metric of all the carriers available for the base station to select as primary and secondary component carriers for carrier aggregation transmissions between the base station and the UE.

Some embodiments may additionally include the base station considering one or more additional carrier attributes as a basis for selecting the primary and secondary component carriers at block 506, including but not limited to (i) each carrier's insertion loss (e.g., table 200, column 214), (ii) each carrier's transmit power at the base station (e.g., table 200, column 216), and/or (iii) each carrier's receive power at the UE (not shown).

In one example, if three carriers each have the same group delay variation, the base station may (subject to the UE's carrier aggregation capabilities from block 504) select the carrier of the three having the lowest insertion loss as the primary component carrier, select the carrier of the three having the second-lowest insertion loss as the first secondary component carrier, and select the carrier of the three having the third-lowest insertion loss as the second secondary component carrier.

In another example, if three carriers each have the same group delay variation, the base station may (subject to the UE's carrier aggregation capabilities from block 504) select the carrier of the three having the highest transmit power at the base station as the primary component carrier, select the carrier of the three having the second-highest transmit power at the base station as the first secondary component carrier, and select the carrier of the three having the third-highest transmit power at the base station as the second secondary component carrier.

If each of the three carriers with the same group delay variation also has the same transmit power at the base station, then the base station may consider each carrier's insertion loss and/or each carrier's receive power at the UE as a basis for selecting the primary and secondary component carriers. For example, in a situation where each of the three carriers has the same group delay and the same transmit power at the base station, the base station may select the carrier of the three having the highest carrier receive power at the UE as the primary component carrier, the carrier of the three having the second-highest carrier receive power at the UE as the first secondary component carrier, and the carrier of the three having the third-highest carrier receive power at the UE as the second secondary component carrier. Alternatively, if each of the three carriers with the same group delay variation also has the same transmit power at the base station, the base station may select the carrier of the three having the lowest insertion loss as the primary component carrier, the carrier of the three having the second-lowest insertion loss as the first secondary component carrier, and the carrier of the three having the third-lowest insertion loss as the second secondary component carrier.

After selecting the primary and secondary component carriers for the carrier aggregation transmission at block 506, the method 500 advances to block 508, where the base station allocates the selected primary and secondary component carriers (selected in block 506) for the carrier aggregation transmission. In LTE embodiments, the allocation may include scheduling the carrier transmission to use certain LTE resource blocks within the selected primary and secondary component carriers during one or more upcoming transmit time intervals.

Next, at block 510, the base station informs the UE of the allocation performed at block 508. In LTE embodiments, informing the UE of the allocation may include informing the UE of the selected primary and secondary component carriers and/or informing the UE of the particular LTE resource blocks within the selected primary and secondary component carriers for the carrier aggregation transmission, e.g., via control signaling from the base station to the UE.

After informing the UE of the allocation at block 510, method 500 advances to block 512 where the base station executes the carrier aggregation transmission between the base station and the UE according the allocation performed at block 508 and communicated to the UE at block 510. In LTE embodiments, executing the carrier aggregation transmission may include transmitting and/or receiving data within the allocated LTE resource blocks within the selected primary and secondary component carriers.

Figure 6:
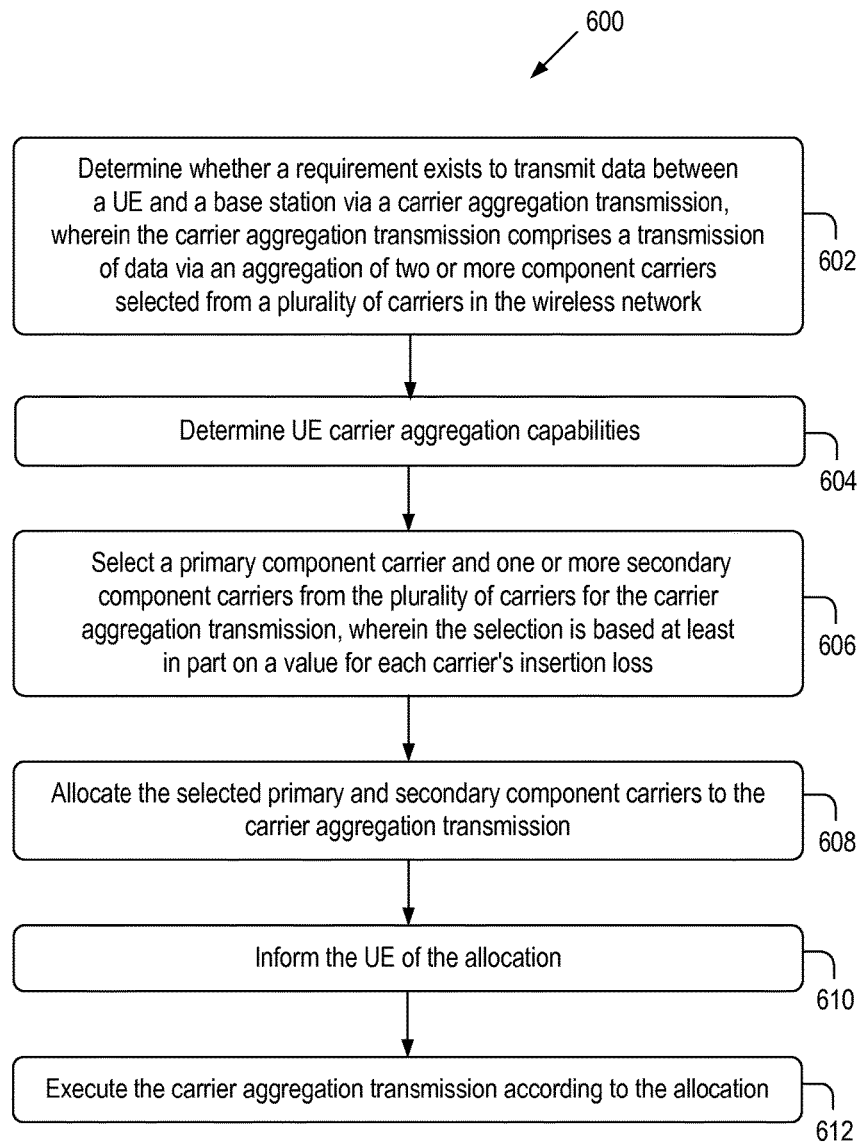
FIG. 6 is a flow chart depicting aspects of an example method implemented by a base station for selecting primary and secondary component carriers for carrier aggregation transmissions based on carrier insertion loss values according to some embodiments of the disclosed systems and methods.

FIG. 6 is a flow chart depicting aspects of an example method 600 implemented by a base station for selecting primary and secondary component carriers for carrier aggregation transmissions based at least in part on carrier insertion loss values according to some embodiments of the disclosed systems and methods. In operation, method 600 is performed by any base station or similar network element in a multiple-access transmission network comprising a plurality of carriers, where each carrier has a respective insertion loss. In some embodiments, method 600 may be implemented by a base station such as any of the base stations disclosed and described herein, including but not limited to base stations 102 and 300 shown and described with reference FIGS. 1 and 3, respectively. Some example embodiments are described with reference to LTE wireless networks, but features and functions of method 600 are equally applicable to other multiple access networks that are configured for carrier aggregation transmissions.

Method 600 begins at block 602, where a base station determines that a requirement exists to transmit data between a UE and the base station via a carrier aggregation transmission, wherein the carrier aggregation transmission comprises a transmission of data via an aggregation of two or more component carriers selected from the plurality of carriers in the wireless network. As noted above, the base station may determine the existence of the requirement to transmit data between the UE and the base station via carrier aggregation in multiple ways, including but not limited to, for example, (i) a request received by the base station from the UE (or perhaps from another network element) for the UE to transmit data on the uplink to the base station (e.g., to send an email with an attachment, to send streaming video from the UE, to perform a file transfer, or some other type of communication session) and/or (ii) a request received by the base station from the UE (or perhaps from another network element) for the UE to receive data on the downlink to the UE (e.g., to receive an email with an attachment, to receive streaming video, to perform a file transfer).

Next, method 600 advances to block 604, where the base station determines the UE's carrier aggregation capabilities. In some embodiments, the base station determines whether the UE supports carrier aggregation transmission, and if so, the number of carriers the UE supports for carrier aggregation transmissions (e.g., two, three, four, or five carriers, or perhaps more in the future). For LTE embodiments, the base station may also determine which LTE bands the UE supports, whether the UE supports contiguous and/or non-contiguous carrier aggregation, whether the UE supports inter-band and/or intra-band carrier aggregation, and any other limitations or restrictions on the UE's carrier aggregation capabilities (e.g., the maximum bandwidth of a carrier aggregation transmission that the UE can support). In some embodiments, the UE informs the base station about the UE's carrier aggregation capabilities via messaging sent from the UE to the base station when the UE registers or attaches with the base station or perhaps other messaging. Additionally or alternatively, the base station may learn the UE's carrier aggregation capabilities in other ways, such as from a network provided UE profile record, for example.

Once the base station has determined the UE's carrier aggregation capabilities (and/or limitations), the base station can then use the information about the UE's carrier aggregation capabilities (and/or limitations) when selecting primary and secondary component carriers for carrier aggregation transmissions between the base station and the UE. In some LTE embodiments, the UE and base station may both be capable of carrier aggregation transmissions that include (i) multiple contiguous carriers in one LTE band, (ii) multiple non-contiguous carriers in one LTE band, or (iii) multiple non-contiguous carriers in different LTE bands. In some embodiments, the base station may exclude certain carriers from consideration as primary or secondary component carriers for a carrier aggregation transmission between the UE and the base station based on the UE's reported carrier aggregation capabilities.

At block 606, and in response to determining that the requirement exists to transmit data between the UE and a base station via a carrier aggregation transmission in block 602 (and based on the UE's carrier aggregation capabilities determined in block 604), the base station selects a primary component carrier and one or more secondary component carriers for the carrier aggregation transmission, wherein the selection is based at least in part on a value for each carrier's insertion loss. In some embodiments, each carrier's insertion loss is stored in a table, database, or other data structure, such as table 200 (FIG. 2) for example. In such embodiments, block 606 includes accessing the table, database, or other data structure to obtain carrier attributes (e.g., each carrier's group delay metric (i.e., group delay and/or group delay variation), insertion loss, and/or transmit power at the base station) as part of selecting the primary and secondary component carriers for the carrier aggregation transmission.

In operation, the base station selects the primary component carrier and the one or more secondary component carriers from the plurality of carriers in the network, or at least from a subset of carriers in the network that have been designated or determined as available for carrier aggregation transmissions. For example, the UE's carrier aggregation capabilities (block 604) may limit which carriers the UE supports for carrier aggregation (e.g., in LTE embodiments, the bands in which the UE supports carrier aggregation and whether the UE supports contiguous, non-contiguous, inter-band, and/or intra-band carrier aggregation).

In embodiments where the base station uses the value of each carrier's respective insertion loss as a basis for selecting primary and secondary component carriers, the value of the insertion loss of the primary component carrier selected at block 606 is less than the value of the insertion loss of each of the one or more secondary component carriers selected at block 606. In some embodiments, the primary component carrier selected at block 606 has the lowest insertion loss of all the carriers available for the base station to select as primary and secondary component carriers for carrier aggregation transmissions between the base station and the UE.

Some embodiments may additionally include the base station considering one or more additional carrier attributes as a basis for selecting the primary and secondary component carriers at block 606, including but not limited to (i) each carrier's group delay variation (e.g., table 200, column 212), (ii) each carrier's group delay (not shown), (iii) each carrier's transmit power at the base station (e.g., table 200, column 216), and/or (iv) each carrier's receive power at the UE (not shown).

In one example, when using the value of each carrier's respective insertion loss and group delay variation as bases for selecting primary and secondary component carriers, if three carriers each have the same insertion loss, the base station may (subject to the UE's carrier aggregation capabilities from block 604) select the carrier of the three having the lowest group delay variation as the primary component carrier, select the carrier of the three having the second-lowest group delay variation as the first secondary component carrier, and select the carrier of the three having the third-lowest group delay variation as the second secondary component carrier.

In another example, when using the value of each carrier's respective insertion loss and transmit power as bases for selecting primary and secondary component carriers, if three carriers each have the same insertion loss, the base station may (subject to the UE's carrier aggregation capabilities from block 504) select the carrier of the three having the highest transmit power at the base station as the primary component carrier, select the carrier of the three having the second-highest transmit power at the base station as the first secondary component carrier, and select the carrier of the three having the third-highest transmit power at the base station as the second secondary component carrier.

If each of the three carriers with the same insertion loss also has the same transmit power at the base station, then the base station may consider any one or more of each carrier's respective group delay, group delay variation, and/or each carrier's receive power at the UE as additional bases for selecting primary and secondary component carriers.

For example, in a situation where each of the three carriers with the same insertion loss has the same transmit power at the base station, the base station use each carrier's respective receive power at the UE as an additional basis for selecting primary and secondary component carriers. In such a situation, the base station may select the carrier of the three having the highest carrier receive power at the UE as the primary component carrier, the carrier of the three having the second-highest carrier receive power at the UE as the first secondary component carrier, and the carrier of the three having the third-highest carrier receive power at the UE as the second secondary component carrier.

Alternatively, in a situation where each of the three carriers with the same insertion loss also has the same transmit power at the base station, the base station may use each carrier's respective group delay variation as an additional basis for selecting primary and secondary component carriers. In such a situation, the base station may select the carrier of the three having the lowest group delay variation as the primary component carrier, the carrier of the three having the second-lowest group delay variation as the first secondary component carrier, and the carrier of the three having the third-lowest group delay variation as the second secondary component carrier.

After selecting the primary and secondary component carriers for the carrier aggregation transmission at block 606, the method 600 advances to block 608, where the base station allocates the selected primary and secondary component carriers (selected in block 606) for the carrier aggregation transmission. In LTE embodiments, the allocation may include scheduling the carrier transmission to use certain LTE resource blocks within the selected primary and secondary component carriers during one or more upcoming transmit time intervals.

Next, at block 610, the base station informs the UE of the allocation performed at block 608. In LTE embodiments, informing the UE of the allocation may include informing the UE of the selected primary and secondary component carriers and/or informing the UE of the particular LTE resource blocks within the selected primary and secondary component carriers for the carrier aggregation transmission, e.g., via control signaling from the base station to the UE.

After informing the UE of the allocation at block 610, method 600 advances to block 612 where the base station executes the carrier aggregation transmission between the base station and the UE according the allocation performed at block 608 and communicated to the UE at block 610. As noted above, in LTE embodiments, executing the carrier aggregation transmission may include transmitting and/or receiving data within the allocated LTE resource blocks within the selected primary and secondary component carriers.

Figure 7:
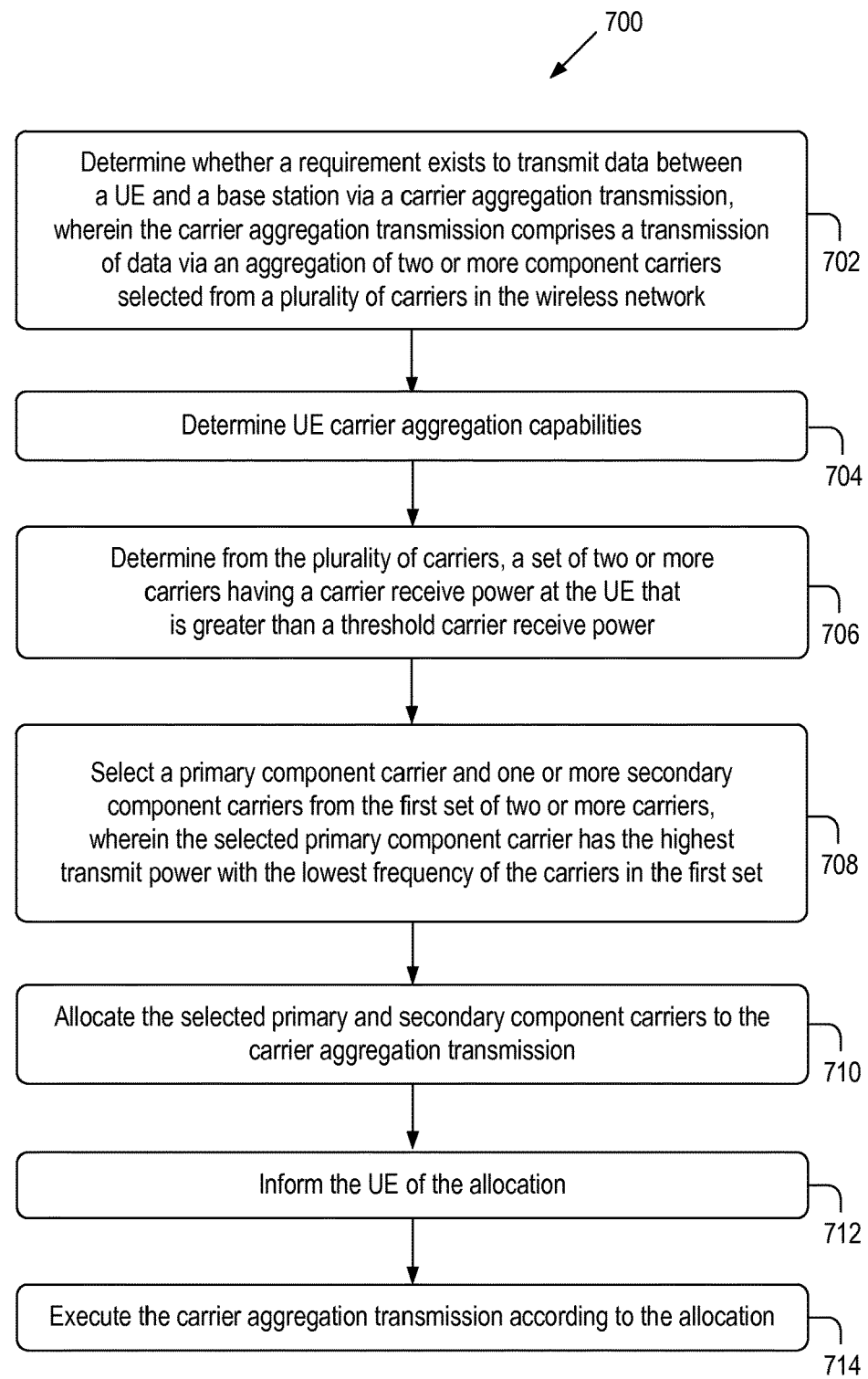
FIG. 7 is a flow chart depicting aspects of an example method implemented by a base station for selecting primary and secondary component carriers for carrier aggregation transmissions based on carrier transmit power at a base station and carrier receive power at a UE according to some embodiments of the disclosed systems and methods.

FIG. 7 is a flow chart depicting aspects of an example method 700 implemented by a base station for selecting primary and secondary component carriers for carrier aggregation transmissions based at least in part on carrier transmit power at the base station and carrier receive power at a UE according to embodiments of the disclosed systems and methods.

In operation, method 700 is performed by any base station or similar network element in a transmission network comprising a plurality of carriers where the base station has information regarding each carrier's transmit power at the base station and each carrier's receive power at the UE. In some embodiments, method 700 may be implemented by a base station such as any of the base stations disclosed and described herein, including but not limited to base stations 102 and 300 shown and described with reference FIGS. 1 and 3, respectively. Some example embodiments are described with reference to LTE wireless networks, but features and functions of method 700 are equally applicable to other multiple access networks that are configured for carrier aggregation transmissions.

Method 700 begins at block 702, where a base station determines that a requirement exists to transmit data between a UE and the base station via a carrier aggregation transmission, wherein the carrier aggregation transmission comprising a transmission of data via an aggregation of two or more component carriers selected from the plurality of carriers in the network.

In operation, and as noted above, the base station may determine the existence of the requirement to transmit data between the UE and the base station via carrier aggregation in multiple ways, including but not limited to, for example, (i) a request received by the base station from the UE (or perhaps from another network element) for the UE to transmit data on the uplink to the base station (e.g., to send an email with an attachment, to send streaming video from the UE, to perform a file transfer, or some other type of communication session) and/or (ii) a request received by the base station from the UE (or perhaps from another network element) for the UE to receive data on the downlink to the UE (e.g., to receive an email with an attachment, to receive streaming video, to perform a file transfer).

Next, method 700 advances to block 704, where the base station determines the UE's carrier aggregation capabilities. In some embodiments, and as noted above, the base station determines whether the UE supports carrier aggregation transmission, and if so, the number of carriers the UE supports for carrier aggregation transmissions (e.g., two, three, four, or five carriers, or perhaps more in the future). For LTE embodiments, the base station may also determine which LTE bands the UE supports, whether the UE supports contiguous and/or non-contiguous carrier aggregation, whether the UE supports inter-band and/or intra-band carrier aggregation, and any other limitations or restrictions on the UE's carrier aggregation capabilities (e.g., the maximum bandwidth of a carrier aggregation transmission that the UE can support). In some embodiments, the UE informs the base station about the UE's carrier aggregation capabilities via messaging sent from the UE to the base station when the UE registers or attaches with the base station or perhaps other messaging. Additionally or alternatively, the base station may learn the UE's carrier aggregation capabilities in other ways, such as from a network provided UE profile record, for example.

Once the base station has determined the UE's carrier aggregation capabilities (and/or limitations), the base station can then use the information about the UE's carrier aggregation capabilities (and/or limitations) when selecting primary and secondary component carriers for carrier aggregation transmissions between the base station and the UE. In some LTE embodiments, the UE and base station may both be capable of carrier aggregation transmissions that include (i) multiple contiguous carriers in one LTE band, (ii) multiple non-contiguous carriers in one LTE band, or (iii) multiple non-contiguous carriers in different LTE bands. In some embodiments, the base station may exclude certain carriers from consideration as primary or secondary component carriers for a carrier aggregation transmission between the UE and the base station based on the UE's reported carrier aggregation capabilities.

At block 706, and in response to determining that the requirement exists to transmit data between the UE and the base station via a carrier aggregation transmission in block 702, the base station determines from the plurality of carriers in the wireless network (or perhaps a group of carriers in the plurality of carriers that excludes certain carriers based on the UE's reported carrier aggregation capabilities in at block 704), a subset of two or more carriers having a carrier receive power at the UE that is greater than a threshold carrier receive power.

In operation, a UE may receive multiple carriers from one or more base stations, and in some embodiments, the UE reports the receive power of each received carrier to one or more of the base stations from which it receives the carriers. For LTE embodiments, the UE reports a carrier receive power for each of its received carriers to an eNodeB (typically the eNodeB with which the UE is attached or registered) via one or more Channel Quality Indicator (CQI)/Channel State Information (CSI) messages. In other networks, a UE or other wireless communication device may use different messaging or signaling to report carrier receive power to a base station, head end, or similar network controller element.

After determining the subset of two or more carriers having a carrier receive power at the UE that is greater than a threshold carrier receive power at block 706, method 700 advances to block 708, where the base station selects a primary component carrier and one or more secondary component carriers (from the subset determined at block 706) for the carrier aggregation transmission.

In some embodiments, the base station selects the primary and secondary component carriers based on the transmit power and frequency of each carrier in the set of two or more carriers determined at block 706, where the base station uses each carrier's respective transmit power as a first basis to select component carriers, and then, if two or more carriers have the same transmit power, the base station uses the frequency of each of the two or more carriers having to same transmit power as a secondary basis to select component carriers. In such embodiments, the selected primary component carrier has the highest transmit power with the lowest frequency of the carriers in the first set, and the selected one or more secondary component carriers includes a first secondary component carrier that has either (i) a transmit power that is lower than the transmit power of the selected primary component carrier or (ii) a frequency that is higher than the selected primary component carrier when the selected primary component carrier and first secondary component carrier have the same transmit power. In some embodiments, the selected one or more secondary component carriers further includes a second secondary component carrier that has either (i) a transmit power that is lower than the transmit power of the selected first secondary component carrier or (ii) an operating frequency that is higher than the selected first secondary component carrier when the selected secondary component carrier and first secondary component carrier have the same transmit power.

After selecting the primary and secondary component carriers for the carrier aggregation transmission at block 708, the method 700 advances to block 710, where the base station allocates the selected primary and secondary component carriers (selected in block 708) for the carrier aggregation transmission. In LTE embodiments, the allocation may include scheduling the carrier transmission to use certain LTE resource blocks within the selected primary and secondary component carriers during one or more upcoming transmit time intervals.

Next, at block 712, the base station informs the UE of the allocation performed at block 710. In LTE embodiments, informing the UE of the allocation may include informing the UE of the selected primary and secondary component carriers and/or informing the UE of the particular LTE resource blocks within the selected primary and secondary component carriers for the carrier aggregation transmission, e.g., via control signaling from the base station to the UE.

After informing the UE of the allocation at block 712, method 700 advances to block 714 where the base station executes the carrier aggregation transmission between the base station and the UE according the allocation performed at block 710 and communicated to the UE at block 712. In LTE embodiments, executing the carrier aggregation transmission may include transmitting and/or receiving data within the allocated LTE resource blocks within the selected primary and secondary component carriers.

While various aspects have been disclosed herein, other aspects will be apparent to those of skill in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular example embodiments only, and is not intended to be limiting. For example, while the disclosed example embodiments focus on LTE embodiments, the disclosed systems and methods may be equally applicable to other networks that implement carrier aggregation transmission.

What is claimed is:

1. A method comprising:
   in a wireless network comprising a plurality of carriers, wherein each carrier has a transmit power at a base station and a frequency, the base station determining whether a requirement exists to transmit data between a UE and the base station via a carrier aggregation transmission, wherein the carrier aggregation transmission comprises a transmission of data via an aggregation of two or more component carriers;
   in response to determining that a requirement exists to transmit data between the UE and the base station via a carrier aggregation transmission, the base station (i) determining a set of two or more carriers from the plurality of carriers based on each carrier's respective receive power at the UE, wherein each carrier in the set has a respective receive power at the UE that is greater than a threshold receive power, and (ii) selecting a primary component carrier and one or more secondary component carriers from the set based on each carrier's respective transmit power and frequency, wherein the primary component carrier has the highest transmit power with the lowest frequency of the carriers in the set; and
   after selecting the primary component carrier and the one or more secondary component carriers, the base station (i) allocating the primary component carrier and one or more secondary component carriers for the carrier aggregation transmission, (ii) informing the UE of the allocation, and (iii) executing the carrier aggregation transmission according to the allocation.

2. The method of claim 1, wherein the one or more secondary component carriers comprises a first secondary component carrier, wherein the first secondary component carrier has either (i) a transmit power that is lower than the primary component carrier's transmit power or (ii) a frequency that is higher than the primary component carrier's frequency when the primary component carrier and first secondary component carrier have the same transmit power.

3. The method of claim 2, wherein the one or more secondary component carriers further comprises a second secondary component carrier, wherein the second secondary component carrier has either (i) a transmit power that is lower than the first secondary component carrier's transmit power or (ii) a frequency that is higher than the first secondary component carrier's frequency when the second secondary component carrier and first secondary component carrier have the same transmit power.

4. The method of claim 1, further comprising:
the base station accessing a tangible, non-transitory, computer-readable memory to obtain one or more of (i) each carrier's receive power at the UE, (ii) each carrier's transmit power at the base station, and (ii) each carrier's frequency.

5. The method of claim 1, further comprising:
before selecting a primary component carrier and one or more secondary component carriers from the set of two or more carriers, the base station (i) determining one or more carrier aggregation capabilities of the UE and (ii) excluding carriers from the set that are incompatible with the UE's one or more carrier aggregation capabilities.

6. The method of claim 1, wherein the wireless network is an LTE network, wherein the base station is an eNodeB, and wherein the primary component carrier and the one or more secondary component carriers of the carrier aggregation transmission comprise any of (i) multiple contiguous carriers in one LTE band, (ii) multiple non-contiguous carriers in one LTE band, or (iii) multiple non-contiguous carriers in different LTE bands.

7. The method of claim 1, wherein the wireless network is an LTE network, wherein the base station is an eNodeB, and wherein allocating the primary component carrier and one or more secondary component carriers for the carrier aggregation transmission comprises the eNodeB allocating LTE resource blocks within the primary component carrier and one or more secondary component carriers for the carrier aggregation transmission.

8. A base station comprising:
one or more processors; and
tangible, non-transitory, computer-readable memory comprising instructions encoded therein, wherein the instructions, when executed by the one or more processors, cause the base station to perform a method comprising:
in a network comprising a plurality of carriers, wherein each carrier has a transmit power at the base station and a frequency, the base station determining whether a requirement exists to transmit data between a UE and the base station via a carrier aggregation transmission, wherein the carrier aggregation transmission comprises a transmission of data via an aggregation of two or more component carriers;
in response to determining that a requirement exists to transmit data between the UE and the base station via a carrier aggregation transmission, the base station (i) determining a set of two or more carriers from the plurality of carriers based on each carrier's respective receive power at the UE, wherein each carrier in the set has a respective receive power at the UE that is greater than a threshold receive power, and (ii) selecting a primary component carrier and one or more secondary component carriers from the set based on each carrier's respective transmit power and frequency, wherein the primary component carrier has the highest transmit power with the lowest frequency of the carriers in the set; and
after selecting the primary component carrier and the one or more secondary component carriers, the base station (i) allocating the primary component carrier and one or more secondary component carriers for the carrier aggregation transmission, (ii) informing the UE of the allocation, and (iii) executing the carrier aggregation transmission according to the allocation.

9. The base station of claim 8, wherein the one or more secondary component carriers comprises a first secondary component carrier, wherein the first secondary component carrier has either (i) a transmit power that is lower than the primary component carrier's transmit power or (ii) a frequency that is higher than the primary component carrier's frequency when the primary component carrier and first secondary component carrier have the same transmit power.

10. The base station of claim 9, wherein the one or more secondary component carriers further comprises a second secondary component carrier, wherein the second secondary component carrier has either (i) a transmit power that is lower than the first secondary component carrier's transmit power or (ii) a frequency that is higher than the first secondary component carrier's frequency when the second secondary component carrier and first secondary component carrier have the same transmit power.

11. The base station of claim 8, wherein the method further comprises accessing the tangible, non-transitory, computer-readable memory or another tangible, non-transitory, computer-readable memory to obtain one or more of (i) each carrier's receive power at the UE, (ii) each carrier's transmit power at the base station, and (ii) each carrier's frequency.

12. The base station of claim 8, wherein the method performed by the base station further comprises:
before selecting a primary component carrier and one or more secondary component carriers from the set of two or more carriers, the base station (i) determining one or more carrier aggregation capabilities of the UE and (ii) excluding carriers from the set that are incompatible with the UE's one or more carrier aggregation capabilities.

13. The base station of claim 8, wherein the network is a wireless LTE network, wherein the base station is an eNodeB, and wherein the primary component carrier and the one or more secondary component carriers of the carrier aggregation transmission comprise any of (i) multiple contiguous carriers in one LTE band, (ii) multiple non-contiguous carriers in one LTE band, or (iii) multiple non-contiguous carriers in different LTE bands.

14. The base station of claim 8, wherein the network is a wireless LTE network, wherein the base station is an eNodeB, and wherein allocating the primary component carrier and one or more secondary component carriers for the carrier aggregation transmission comprises the eNodeB allocating LTE resource blocks within the primary component carrier and one or more secondary component carriers for the carrier aggregation transmission.

15. A tangible, non-transitory, computer-readable media comprising instructions encoded therein, wherein the instructions, when executed by one or more processors, cause a base station comprising the one or more processors to perform a method comprising:
in a network comprising a plurality of carriers, wherein each carrier has a transmit power at the base station and a frequency, the base station determining whether a requirement exists to transmit data between a UE and the base station via a carrier aggregation transmission, wherein the carrier aggregation transmission comprises a transmission of data via an aggregation of two or more component carriers;
in response to determining that a requirement exists to transmit data between the UE and the base station via a carrier aggregation transmission, the base station (i)

determining a set of two or more carriers from the plurality of carriers based on each carrier's respective receive power at the UE, wherein each carrier in the set has a respective receive power at the UE that is greater than a threshold receive power, and (ii) selecting a primary component carrier and one or more secondary component carriers from the set based on each carrier's respective transmit power and frequency, wherein the primary component carrier has the highest transmit power with the lowest frequency of the carriers in the set; and after selecting the primary component carrier and the one or more secondary component carriers, the base station (i) allocating the primary component carrier and one or more secondary component carriers for the carrier aggregation transmission, (ii) informing the UE of the allocation, and (iii) executing the carrier aggregation transmission according to the allocation.

16. The computer-readable media of claim 15, wherein the one or more secondary component carriers comprises a first secondary component carrier, wherein the first secondary component carrier has either (i) a transmit power that is lower than the primary component carrier's transmit power or (ii) a frequency that is higher than the primary component carrier's frequency when the primary component carrier and first secondary component carrier have the same transmit power.

17. The computer-readable media of claim 16, wherein the one or more secondary component carriers further comprises a second secondary component carrier, wherein the second secondary component carrier has either (i) a transmit power that is lower than the first secondary component carrier's transmit power or (ii) a frequency that is higher than the first secondary component carrier's frequency when the second secondary component carrier and first secondary component carrier have the same transmit power.

18. The computer-readable media of claim 15, wherein the network is a wireless LTE network, wherein the base station is an eNodeB, and wherein allocating the primary component carrier and one or more secondary component carriers for the carrier aggregation transmission comprises the eNodeB allocating LTE resource blocks within the primary component carrier and one or more secondary component carriers for the carrier aggregation transmission.

19. The computer-readable media of claim 15, wherein the method performed by the base station further comprises:
before selecting a primary component carrier and one or more secondary component carriers from the set of two or more carriers, the base station (i) determining one or more carrier aggregation capabilities of the UE and (ii) excluding carriers from the set that are incompatible with the UE's one or more carrier aggregation capabilities.

20. The computer-readable media of claim 15, wherein the network is a wireless LTE network, wherein the base station is an eNodeB, and wherein the primary component carrier and the one or more secondary component carriers of the carrier aggregation transmission comprise any of (i) multiple contiguous carriers in one LTE band, (ii) multiple non-contiguous carriers in one LTE band, or (iii) multiple non-contiguous carriers in different LTE bands.

* * * * *